(12) United States Patent
Bethuy

(10) Patent No.: US 9,484,009 B2
(45) Date of Patent: Nov. 1, 2016

(54) MICROPHONE STAND BASE

(71) Applicant: Dennis Bethuy, Hendersonville, TN (US)

(72) Inventor: Dennis Bethuy, Hendersonville, TN (US)

( * ) Notice: Subject to any disclaimer, the term of this patent is extended or adjusted under 35 U.S.C. 154(b) by 0 days.

(21) Appl. No.: 14/690,297

(22) Filed: Apr. 17, 2015

(65) Prior Publication Data

US 2015/0345694 A1 Dec. 3, 2015

Related U.S. Application Data

(60) Provisional application No. 62/004,871, filed on May 29, 2014.

(51) Int. Cl.
| | |
|---|---|
| *G10H 1/34* | (2006.01) |
| *F16M 11/24* | (2006.01) |
| *H04R 1/08* | (2006.01) |
| *H01R 25/00* | (2006.01) |
| *A47B 19/00* | (2006.01) |
| *G10H 1/32* | (2006.01) |

(52) U.S. Cl.
CPC .............. *G10H 1/34* (2013.01); *A47B 19/002* (2013.01); *F16M 11/24* (2013.01); *G10H 1/348* (2013.01); *H01R 25/003* (2013.01); *H04R 1/08* (2013.01); *G10H 1/32* (2013.01)

(58) Field of Classification Search
CPC .......... G10H 1/32; G10H 1/34; G10H 1/348; H04R 1/08; A47B 19/002
USPC ........ 381/366; 248/158, 157, 441.1
See application file for complete search history.

(56) References Cited

U.S. PATENT DOCUMENTS

| | | | | |
|---|---|---|---|---|
| 5,866,829 A * | 2/1999 | Pecoraro | ................. | G10H 1/32 84/177 |
| 6,215,055 B1 * | 4/2001 | Saravis | ................. | G10H 1/348 84/422.1 |
| 6,459,023 B1 * | 10/2002 | Chandler | ................. | G10H 1/32 84/177 |
| 6,663,060 B1 * | 12/2003 | Gifford, Sr. | ............... | F16B 7/14 248/125.8 |
| 6,720,490 B1 * | 4/2004 | Bruce | ................. | A47B 19/002 84/327 |
| 7,131,615 B1 * | 11/2006 | Bruce | ................. | A47B 19/002 248/127 |
| 7,514,619 B1 * | 4/2009 | Bruce | ................. | A47B 81/00 100/100 |
| 7,675,399 B2 * | 3/2010 | Ebrey | ................. | H01C 10/14 338/153 |
| 8,094,857 B2 * | 1/2012 | Upham | ................. | G10H 1/32 381/363 |
| 8,614,385 B2 * | 12/2013 | McKinney | ............ | G10H 1/348 84/453 |
| 9,185,776 B2 * | 11/2015 | Ahern | ................ | H05B 33/0863 |
| D745,924 S * | 12/2015 | Trifilio | ........................ | D17/20 |
| 2004/0250673 A1 * | 12/2004 | Salerno | ................. | G10H 1/32 84/746 |
| 2006/0120550 A1 * | 6/2006 | McCann | ................. | H04R 1/08 381/363 |
| 2008/0060507 A1 * | 3/2008 | Welchering | .......... | G10H 1/0016 84/645 |
| 2015/0325224 A1 * | 11/2015 | Manosa Ripoll | ........ | G10H 1/32 84/444 |
| 2016/0044761 A1 * | 2/2016 | Ahern | ................ | H05B 33/0863 315/294 |

* cited by examiner

*Primary Examiner* — Eret McNichols
(74) *Attorney, Agent, or Firm* — Richard Finkelstein

(57) ABSTRACT

According to some embodiments a microphone stand base is provided. The microphone stand base may comprise a backer to couple a post and a bottom plate extending from the backer. The backer is coupled to the bottom plate such that the backer is flush with a plurality of edges of the bottom plate.

14 Claims, 7 Drawing Sheets

MICROPHONE STAND BASE

BACKGROUND

Nashville, Tenn. is the home of country music and has many small music venues that are found all over the city. The stages of these music venues are typically small in order to allow for a larger audience. Because of the small stages, musicians must limit the amount of equipment they use while performing.

DETAILED DESCRIPTION

Musicians, such as, but not limited to guitarists, may typically use (i) a microphone on a microphone stand and (ii) a pedal board to manage effect pedals. The effect pedals are used to color the sound/signal of a musical instrument that is played though an amplifier. (e.g., overdrive, distortion, flanger, phaser, chorus, reverb, delay, etc.) A pedal board is placed on a floor, for example, of a stage, to facilitate a musician turning the effect pedals on and off with his foot. In some embodiments, an effect pedal will have a variable control so the musician may need to use both hands to play his instrument while continually manipulating the effect pedal with his foot. Having both a microphone stand and a pedal board takes up a significant portion of the stage (e.g., floor space).

Figure 1:
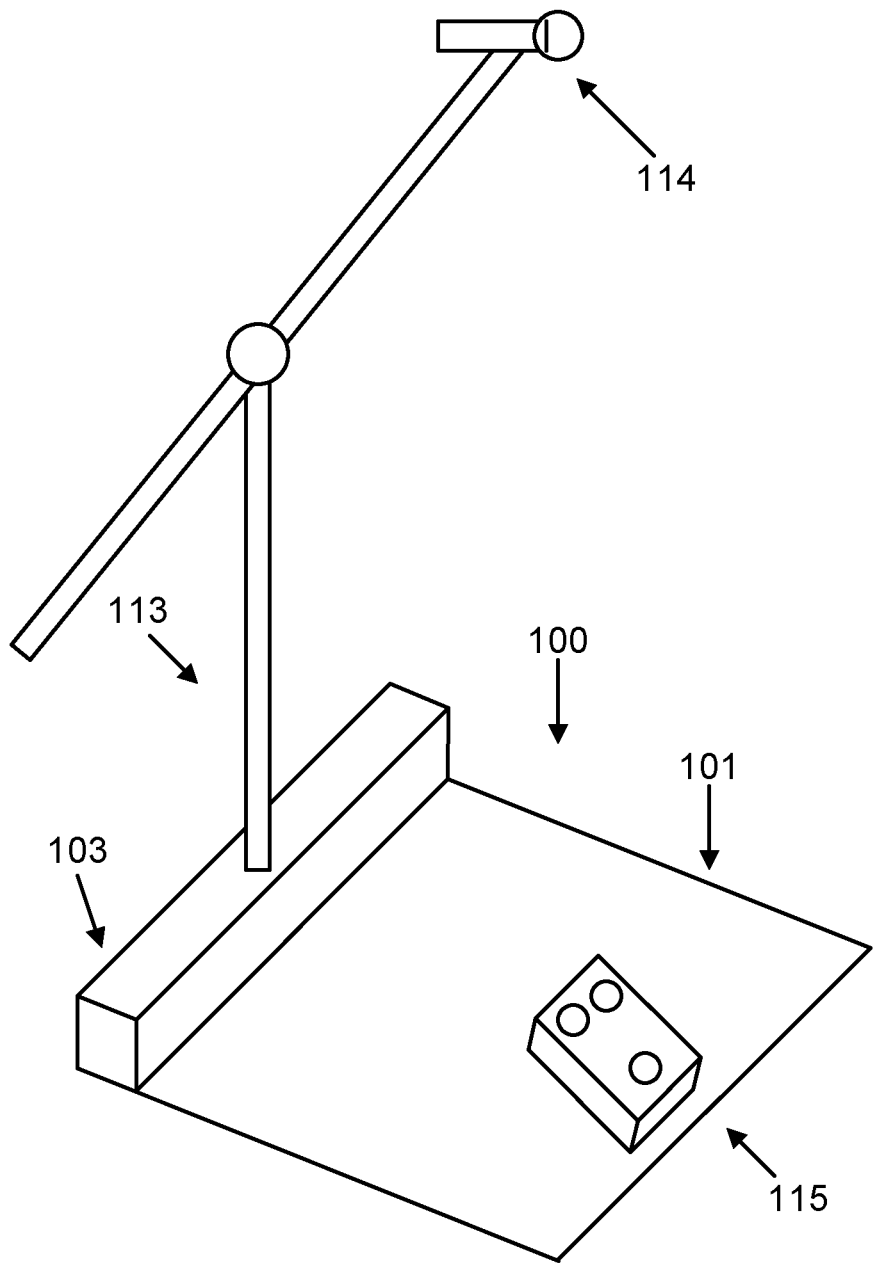
FIG. 1 illustrates a perspective view of a microphone stand base coupled to a post according to some embodiments.
Figure 2:
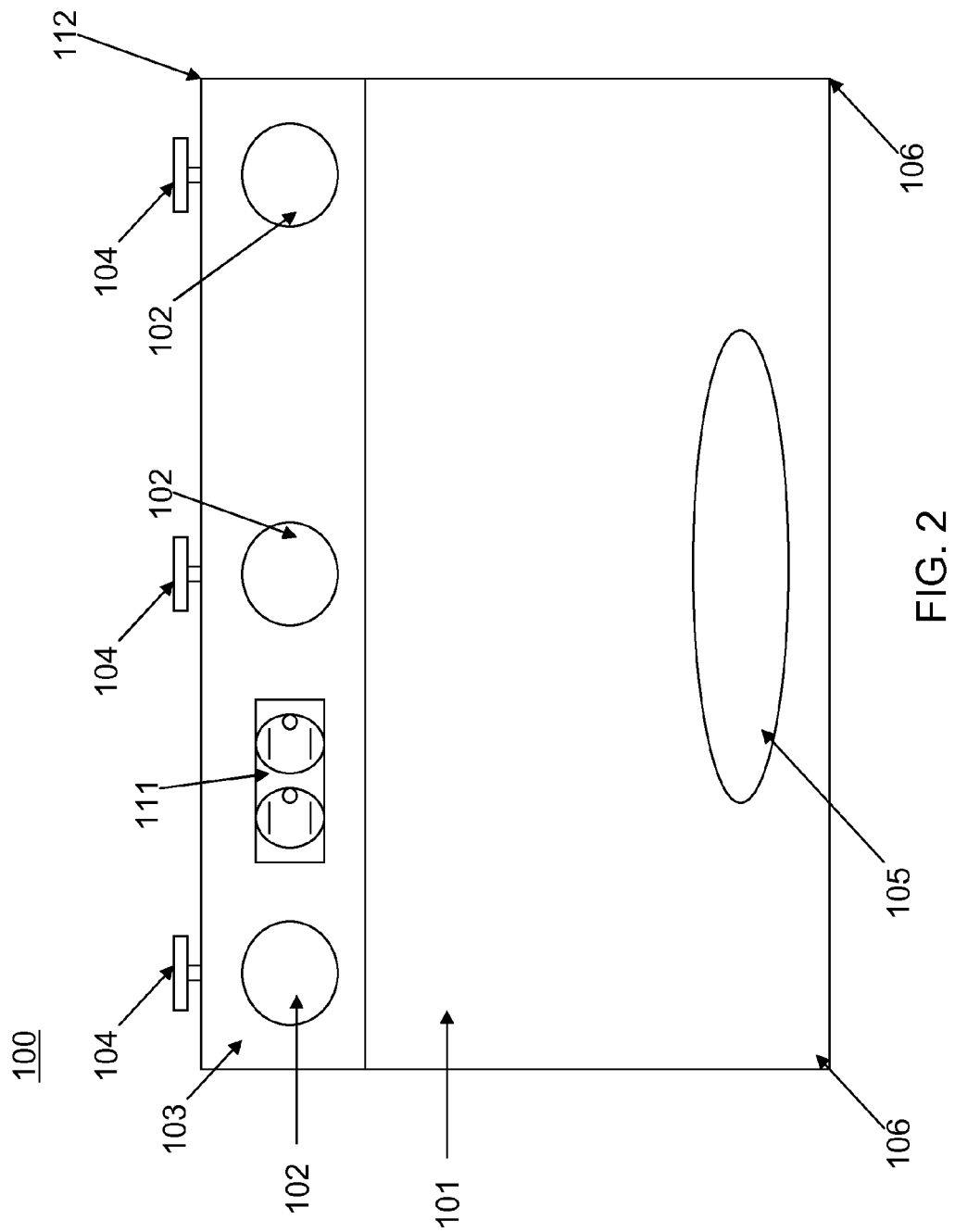
FIG. 2 illustrates a top view of a microphone stand base according to some embodiments.
Figure 3:
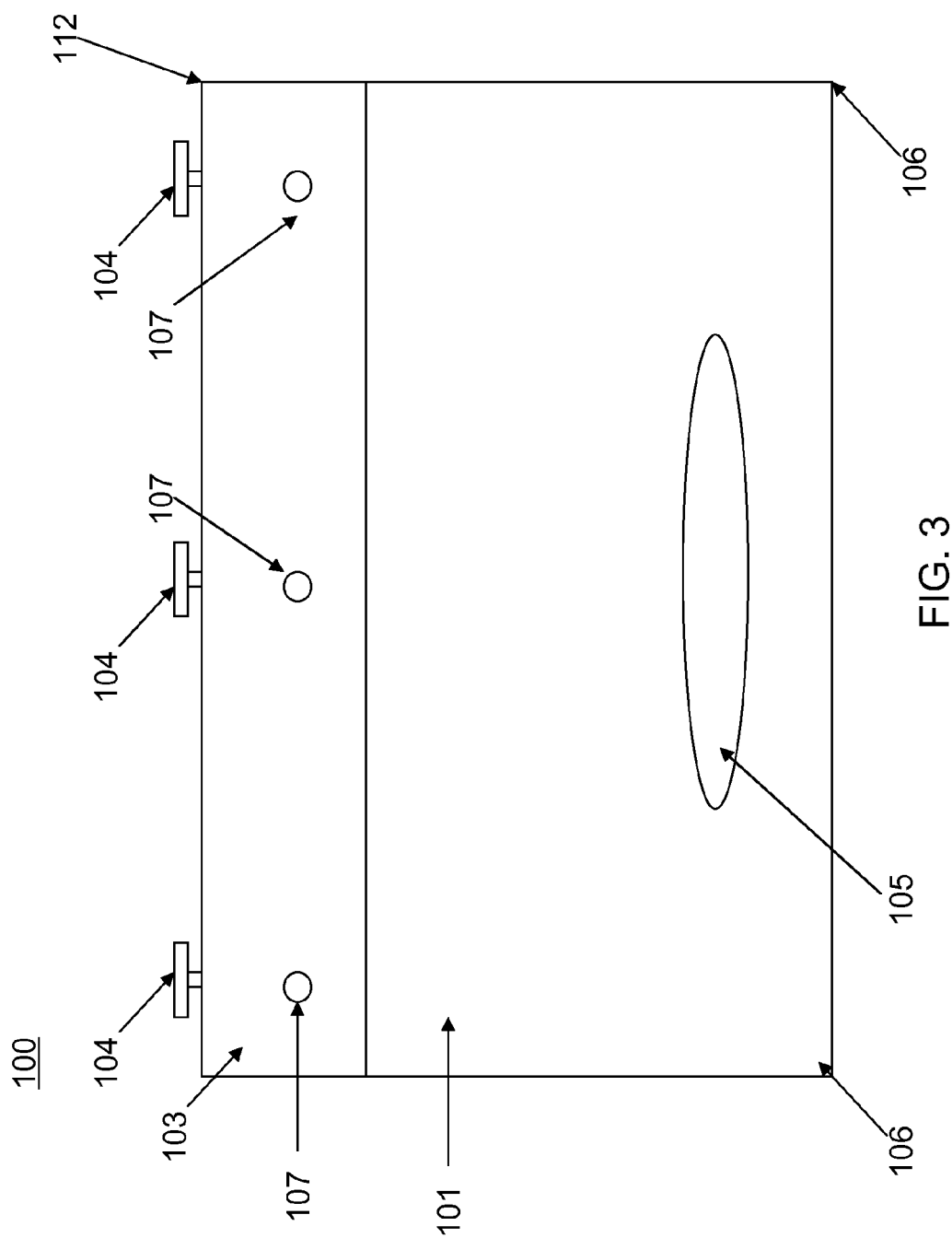
FIG. 3 illustrates a bottom view of a microphone stand base according to some embodiments.
Figure 4:
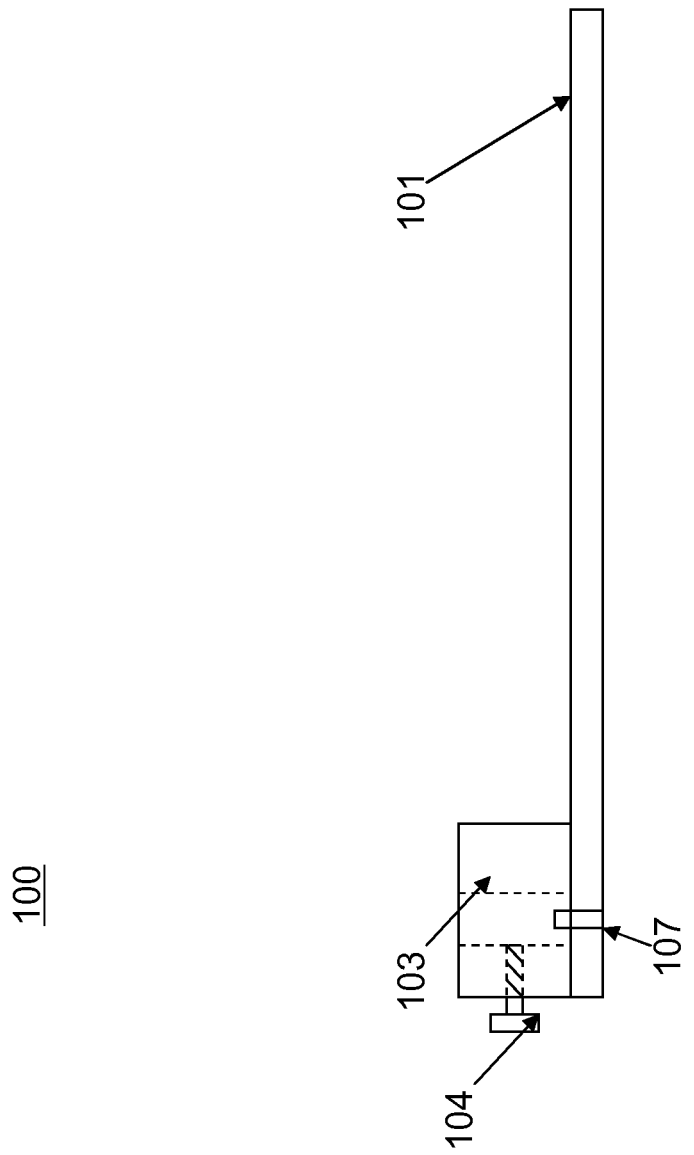
FIG. 4 illustrates a side view of a microphone stand base according to some embodiments.
Figure 5:
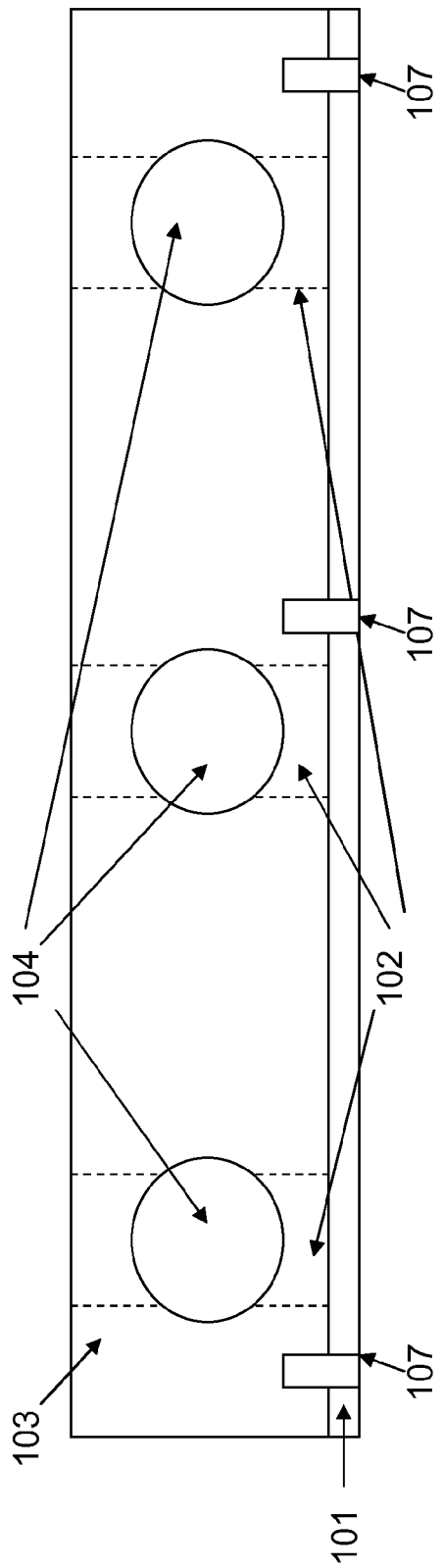
FIG. 5 illustrates a back view of a microphone stand base according to some embodiments.

Now referring to FIG. 1, an embodiment of a microphone stand is illustrated. The microphone stand may comprise a base 100 into which a post 113 for mounting a microphone 114 is coupled. This post 113 may comprise one or more tubes (e.g., telescoping tubes) that may be adjusted for height. A pedal board may comprise a flat board or panel which may serve as a mechanism to assist a musician in managing multiple effect pedals 115. For example, by having each effect pedal 115 affixed to the pedal board (e.g., Velcro), the entire pedal board and its associated effect pedals may be packed up and transported to a next location without a need for disassembly. The following embodiments relate to a microphone stand base 100 for use on a floor that may (1) couple a post 113 in multiple positions and (2) function as a pedal board to couple multiple effect pedals 115 so that musicians may be able to press on the effect pedals 115 using their feet.

Now referring to FIG. 2, FIG. 3, FIG. 4 and FIG. 5 an embodiment of a microphone stand base 100 is illustrated. The microphone stand base 100 comprises a bottom plate 101 extending from a backer 103. The bottom plate 101 may be secured to the backer 103 via a plurality of fasteners 107. The fasteners 107 may comprise, but are not limited to, threaded screws, rivets or weld joints. The bottom plate 101 may comprise front corners 106 and rear corners 112. In some embodiments, the front corners 106 may be rounded to prevent sharp edges from facing the musician. The bottom plate 101 may couple a plurality of effect pedals. For example, the bottom plate 101 may couple a plurality of effect pedals by using, but not limited to, Velcro or double stick tape. The bottom plate 101 may comprise a handle 105 (e.g. a cut out area) to facilitate carrying the microphone stand base 100. The bottom plate 101 may be flat to provide a stable surface so that when an effect pedal is pressed by a musicians' foot, the effect pedal does not come loose from the pedal board or move the microphone stand.

The backer 103 may be weighted sufficiently to prevent tipping when a post 113 (and microphone 114) is coupled to the microphone stand base 100. For example, in some embodiments, the backer 103 may weight between 4 lbs and 8 lbs. The backer may comprise a substantially square or rectangular column shaped piece of metal. The backer 103 may comprise a plurality of post recesses 102 (e.g., round openings) to secure the post 113. As illustrated, the post recesses 102 are oriented on a right side, a left side and in the middle of the backer 103 to allow a musician to configure a position of the post 113 based on the available space at a musical venue or if the musician is right handed or left handed. The post 113 may be coupled to a post recess 102 via a screw mechanism 104. However, in some embodiments, the post recess 102 may be threaded to couple the post. The backer 103 may comprise between 10% and 15% of a width of the microphone stand base and the backer 103 may have a same length as the bottom plate 101. In the present embodiment, the backer 103 comprising between 10% and 15% of a width of the bottom plate 101 may allow for stability of the microphone stand and provide enough "real estate" for a plurality of effect pedals 115.

In some embodiments, the backer 103 may comprise one or more power plugs 111 to provide onboard power to effect pedals 115 that are coupled to the bottom plate 101. The microphone stand base 100 may be connected to a power cord (not shown) to provide power to the power plugs 111. In some embodiments, the backer 103 may be coupled to the bottom plate 101 such that the backer 103 is flush with three edges of the bottom plate 101 (e.g., a plurality of edges).

Figure 6:
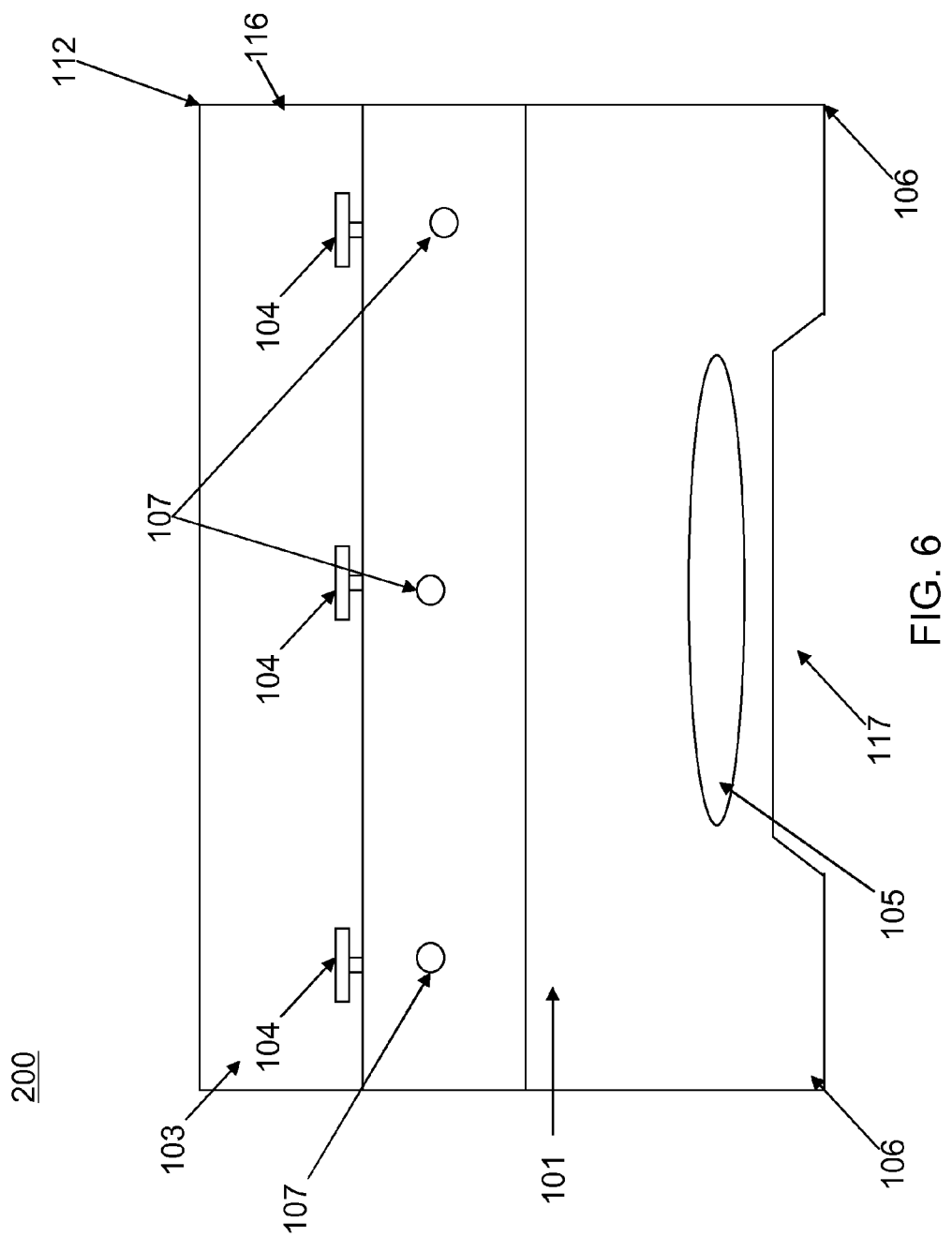
FIG. 6 illustrates a top view of a microphone stand base according to some embodiments.
Figure 7:
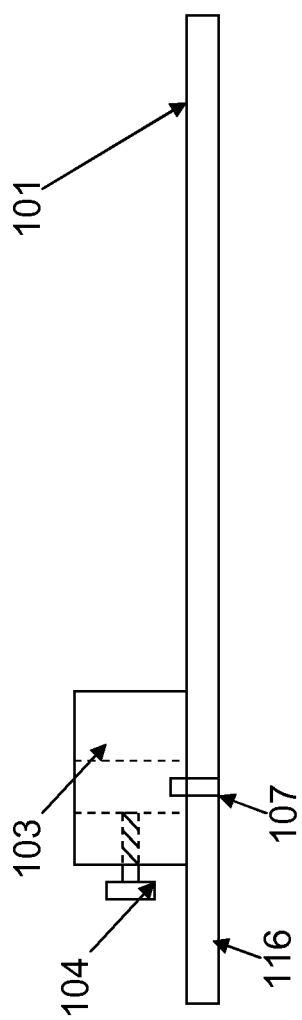
FIG. 7 illustrates a side view of a microphone stand base according to some embodiments.

Now referring to FIG. 6 and FIG. 7, an embodiment of a microphone stand base 200 is illustrated. The microphone stand base 200 comprises a bottom plate 101 extending from a backer 103. In the present embodiment, the backer 103 may be disposed between two edges of the bottom plate 101. In the president embodiment, the backer 103 may be coupled to the bottom plate 101 such that the backer 103 is flush with two edges of the bottom plate 101 (e.g., a plurality of edges). In some embodiments, an offset portion 116 between an edge of the bottom plate 101 and an edge of the backer 103 may be substantially equal to a width of the backer 103. The offset portion 116 may comprise a portion of the bottom plate 101. Having the backer 103 offset from an edge of the bottom plate 101 may provide for greater stability.

In some embodiments, a handle recess 117 may be provided for ease of gripping the microphone stand base 200. The handle recess 117 may allow the handle 105 to be located closer to the backer 103 and thus may provide a more uniform weight distribution when moving the microphone stand base 200 via the handle 105.

Various modifications and changes may be made to the foregoing embodiments without departing from the broader spirit and scope set forth in the appended claims. The following illustrates various additional embodiments and do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

What is claimed is:

1. A microphone stand base for use on a floor comprising:
a rectangular column shaped backer, the backer comprising a plurality of post recesses on a top surface of the backer to couple one or more posts via respective screw mechanisms where each respective screw mechanism is disposed through a sidewall of the backer and into a respective post recess;
a flat bottom plate to rest directly on a floor, the flat bottom plate extending from the backer, wherein (i) the backer is coupled to the flat bottom plate via a plurality of fasteners (ii) the backer is flush with a plurality of edges of the flat bottom plate and (ii) the backer is disposed between a forward edge of the flat bottom plate and a trailing edge of the flat bottom plate; and
a handle co-planar with the flat bottom plate wherein the handle comprises a cut-out area of the flat bottom plate and a distance between the backer to the handle is greater than a distance between the backer to the trailing edge of the flat bottom plate.

2. The microphone stand base of claim 1, wherein the plurality of fasteners extend through the flat bottom plate and into a bottom surface of the backer.

3. The microphone stand base of claim 2, wherein the backer is weighted to prevent tipping when a post is coupled to the microphone stand base.

4. The microphone stand base of claim 1, wherein the plurality of the post recesses comprises a first post recess oriented on a right side of the backer, a second post recess oriented on a left side of the backer, and a third post recess oriented between the first post recess and the second post recess.

5. The microphone stand base of claim 1, wherein the backer comprises between 10% and 15% of a width of the microphone stand base.

6. The microphone stand base of claim 5, wherein the backer comprises a same length as the bottom plate.

7. The microphone stand base of claim 1, wherein the backer comprises one or more power plugs to provide onboard power to effect pedals to be coupled to the bottom plate.

8. A microphone stand base for use on a floor comprising:
a weighted backer comprising a plurality of post recesses on a top surface of the weighted backer to secure a plurality of posts via respective screw mechanisms where each respective screw mechanism is disposed through a sidewall of the weighted backer and into a respective post recess;
a flat bottom plate extending from the backer, wherein the backer comprises between 10% and 15% of a width of the microphone stand base and wherein the backer is coupled to the bottom plate such that the backer is flush with a plurality of edges of the bottom plate, wherein the weighted backer is disposed between a forward edge of the flat bottom plate and a trailing edge of the flat bottom plate; and
a handle co-planar with the flat bottom plate wherein the handle comprises a cut-out area of the flat bottom plate and a distance between the weighted backer to the handle is greater than a distance between the backer to the trailing edge of the flat bottom plate.

9. The microphone stand base of claim 8, wherein the bottom plate is secured to the backer via a plurality of fasteners that extend through the flat bottom plate and into a bottom surface of the weighted backer.

10. The microphone stand base of claim 8, wherein the plurality of the post recesses comprises a first post recess oriented on a right side of the weighted backer, a second post recess oriented on a left side of the weighted backer, and a third post recess oriented between the first post recess and the second post recess.

11. The microphone stand base of claim 8, wherein the weighted backer comprises a same length as the flat bottom plate.

12. The microphone stand base of claim 8, wherein the weighted backer comprises one or more power plugs to provide onboard power to effect pedals to be coupled to the flat bottom plate.

13. A microphone stand base for use on a floor comprising:
a weighted backer comprising a plurality of post recesses, wherein the plurality of the post recesses comprises a first post recess oriented on a right side of the backer, a second post recess oriented on a left side of the backer, and a third post recess of the plurality of post recess oriented between the first post recess and the second post recess to couple the first post recess, the second post recess and the third post recess via respective screw mechanisms where each respective screw mechanism is disposed through a sidewall of the weighted backer and into a respective post recess;
a flat bottom plate secured to the weighted backer via a plurality of fasteners and extending from the backer, wherein the backer comprises between 10% and 15% of a width of the microphone stand base, wherein the backer comprises a same length as the bottom plate, and wherein the backer is coupled to the bottom plate such that the backer is flush with a plurality of edges of the bottom plate wherein the weighted backer is disposed between a forward edge of the flat bottom plate and a trailing edge of the flat bottom plate; and
a handle co-planar with the flat bottom plate wherein the handle comprises a cut-out area of the flat bottom plate and a distance between the weighted backer to the handle is greater than a distance between the backer to the trailing edge of the flat bottom plate.

14. The microphone stand base of claim 13, wherein the weighted backer comprises one or more power plugs to provide onboard power to effect pedals to be coupled to the bottom plate.

* * * * *